United States Patent

[11] 3,566,149

[72] Inventor Pantelis P. Paradissis
Amherst, Ohio
[21] Appl. No. 836,488
[22] Filed June 25, 1969
[45] Patented Feb. 23, 1971
[73] Assignee Lorain Products Corporation

[54] COMB DRIVE CIRCUIT FOR THYRISTORS
6 Claims, 3 Drawing Figs.

[52] U.S. Cl. .......... 307/106, 321/45
[51] Int. Cl. .......... H03k 3/00
[50] Field of Search .......... 307/107, 151; 321/45, 45 (C)

[56] References Cited
UNITED STATES PATENTS
3,119,058 1/1964 Genuit .......... 321/45C
3,320,515 5/1967 Amato et al. .......... 321/13UX
3,418,556 12/1968 Greenberg et al. .......... 321/45X
3,448,367 6/1969 Corey .......... 321/45C

*Primary Examiner*—Robert S. Macon
*Assistant Examiner*—William J. Smith
*Attorney*—John Howard Smith

ABSTRACT: A control circuit for supplying a modulated train of short duration firing pulses to each of a plurality of thyristors. A pulse suppression circuit is connected to a plurality of oscillator circuits which supply firing pulses to respective thyristors. The pulse suppression circuit disables the output of all oscillator circuits to prevent simultaneous firing of the different thyristors only during starting and only during the period preceeding the firing of each thyristor.

INVENTOR.
PANTELIS P. PARADISSIS

BY

PATENTED FEB 23 1971

3,566,149

SHEET 2 OF 2

INVENTOR.
PANTELIS P. PARADISSIS

BY John Howard Smith

COMB DRIVE CIRCUIT FOR THYRISTORS

BACKGROUND OF THE INVENTION

The present invention relates to control circuits and is directed more particularly to control circuits for furnishing a plurality of coordinated trains of firing pulses to a plurality of gate controlled-switching devices.

An important consideration in the utilization of gate controlled switching devices such as thyristors, is the properly coordinated firing thereof to avoid serious fault conditions. In switching circuits such as inverters, wherein two or more thyristors are triggered in a predetermined sequence to direct the flow of large currents from a DC source through the windings of a transformer, the simultaneous application of firing pulses to more than one thyristor may result in the overloading of the DC source. While numerous circuits have been developed which ensure that the gating-on of one thyristor renders nonconducting the previously conducting thyristor, to reduce the above-described danger, all such circuits require that firing signals be applied to only one thyristor at a time.

One method of providing firing pulses to each of a plurality of thyristors has been to provide a plurality of firing pulse-generating circuits, there being a pulse-generating circuit associated with each thyristor. The desired firing pattern of the different thyristors was then imposed by a multistate, multioutput switching circuit which caused the pulse-generating circuits to become energized in the desired sequence.

Heretofore, arrangements of this type have been subject to several difficulties. First, there occurs a transient period upon the initial application of power during which the pulse-generating circuits may begin producing their respective outputs before the multistate-switching circuit, which controls the coordination between the outputs thereof, becomes fully operative. Consequently, upon starting there may occur simultaneous operation in two or more of the pulse-generating circuits resulting in the concurrent firing of two or more thyristors of the power circuit thus causing a serious fault condition.

A second difficulty in the use of a plurality of different pulse-generating circuits is the possibility of simultaneous firing pulses from different pulse-generating circuits during the time when the multistate-switching circuit is changing states. During this period the multistate-switching circuit is unable to control the operative states of the different firing pulse-generating circuits and, therefore, is unable to prevent the application of simultaneous firing pulses to different thyristors. Under these conditions different thyristors may fire simultaneously to produce the above-mentioned fault condition.

SUMMARY OF THE INVENTION

Accordingly, it is an object of the invention to provide an improved control network for use in circuits of the character which furnish trains of firing pulses to each of a plurality of gate controlled-switching elements, such as thyristors.

It is another object of the invention to provide a control circuit which includes a plurality of firing pulse generators, a switching circuit disposed in energizing-deenergizing relationship thereto, and a pulse suppression circuit, whereby the different firing pulse-generating circuits are, under all conditions, prevented from producing simultaneous firing pulses.

It is still another object of the invention to a pulse suppression circuit of the above character which responds to both recurrent and nonrecurrent transient circuit conditions by deenergizing the different firing pulse generators.

Another object of the invention is to provide a pulse suppression circuit which modifies the operation of existing thyristor control circuitry so as to eliminate simultaneity in the generation of firing pulses for different thyristors.

More specifically, it is an object of the invention to provide a thyristor control circuit including a switching arrangement, which periodically causes each of a plurality of pulse generator circuits to furnish firing pulses to respective thyristors, and a pulse suppression circuit, which pulse suppression circuit deenergizes all pulse-generating circuits as power is initially applied and maintains this condition until the switching circuit attains its normal operating condition.

Still another object of the invention is to provide a pulse suppression circuit which is responsive to those circuit changes which cause the deenergization of one pulse-generating circuit and the energization of another pulse-generating circuit to suppress or blank out the outputs of all pulse-generating circuits, thus eliminating overlap between the outputs of the different firing pulse-generating circuits.

Generally speaking, the invention comprises a pulse suppression network for thyristor control circuits of the type which utilize a switching circuit for sequentially energizing each of a plurality of firing pulse-generating circuits which, in turn, furnish firing pulses to respective thyristors. The pulse suppression circuit is arranged to respond to transient circuit conditions produced both during starting and during normal operation by suppressing or blanking out the outputs of all firing pulse generating circuits, thus eliminating simultaneity in the firing pulses therefrom.

DESCRIPTION OF THE INVENTION

Figure 1:
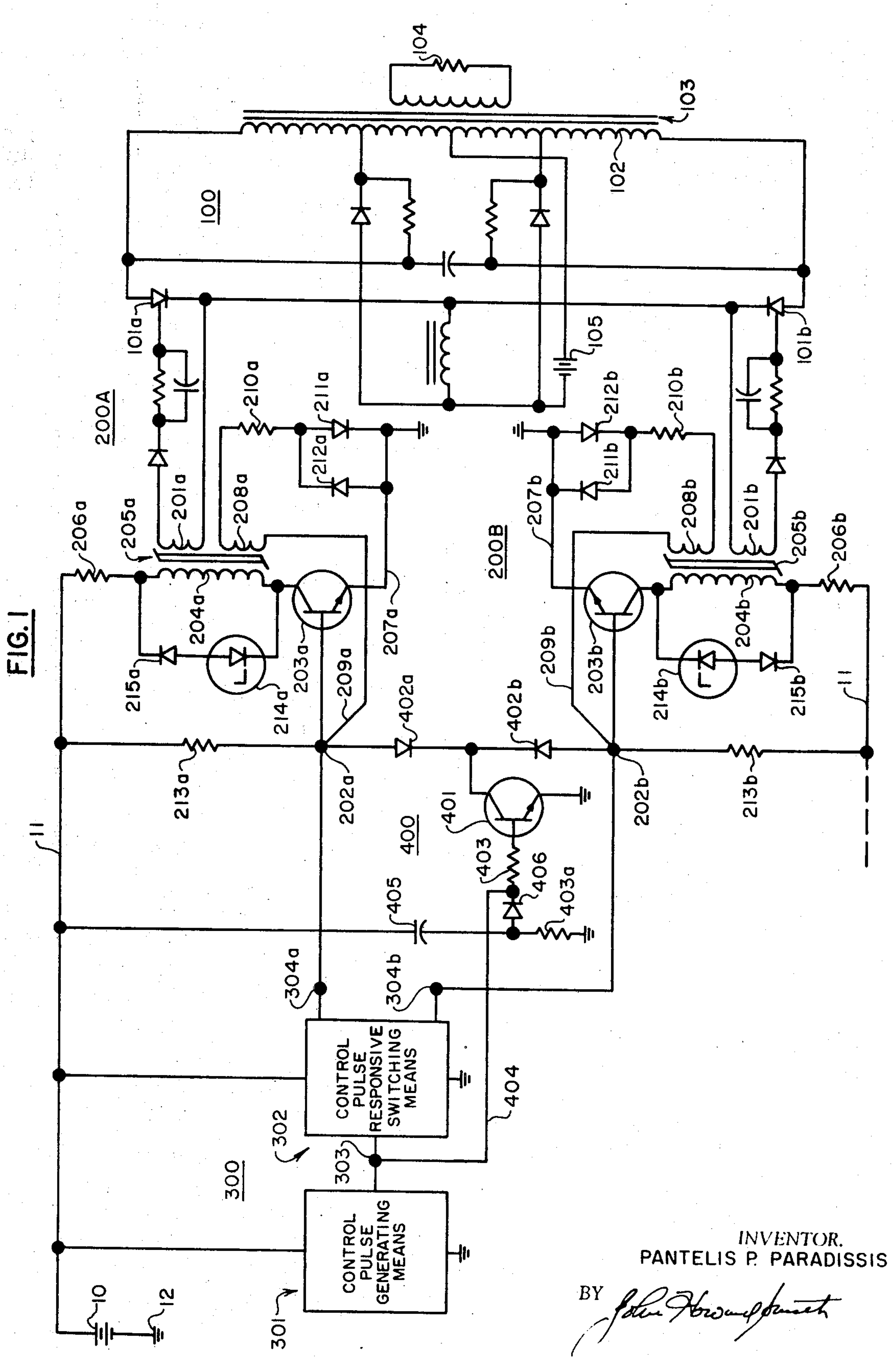
FIG. 1 is a schematic diagram of one form of circuit embodying the invention.

Referring to FIG. 1, there is shown a suitable power circuit 100. Firing signals for the thyristors in power circuit 100 are furnished by a pair of firing pulse-generating means 200A and 200B, which are energized sequentially in response to control signals generated by a switching means 300 which may take the form of a free-running device. Pulse suppression means 400 modifies the control activity of the free-running switching means to eliminate simultaneity or overlap in the operation of the different firing pulse-generating means.

Power circuit 100 of FIG. 1 comprises an inverter of the well-known McMurray-Bedford type, wherein alternate firing of thyristors **101*a* and 101*b* causes an AC voltage to be established across the primary winding 102 of a transformer 103 thereby supplying an AC load 104 from a DC source 105. The operation of power circuit 100** will not be described in detail since the McMurray-Bedford-type inverter is well-known to those skilled in the art and this circuit is intended as merely one example of the type of circuit with which the control circuit of the invention may be advantageously used.

To the end that thyristors **101*a* and 101*b* may be rendered conducting alternately and severally, firing pulse-generating means 200A and 200B, which here take the form of blocking oscillators, are connected across a source of operating potential 10 by means of a positive bus 11 and a ground connection 12. These pulse generating circuits impress trains of firing pulses on output windings 201*a* and 201*b* when the operation of these circuits are not suppressed as a result of the grounding of junctions 292*a* and 202*b* which serve as control junctions therefor. Because of the structural similarity between firing pulse-generating means 200A and 200B**, it will be understood that remarks made with reference to the operation of one firing pulse-generating means will apply with equal force to the other, given appropriate changes in postscript letters.

To the end that firing pulses may be applied to thyristor **101*a* in accordance with the voltage between control junction 202*a* and ground, the emitter-collector path of a controllable conducting means 203*a*, here shown as an NPN transistor, is connected between positive bus 11 and ground through the exciting winding 204*a* of a feedback transformer 205*a*, a current limiting resistor 206*a* and an emitter-connected conductor 207*a*. A feedback winding 208*a*, connected across the base-emitter control circuit of transistor 203*a* through a conductor 209*a*, a current-limiting resistor 210*a* and inverse parallel connected diodes 211*a* and 212*a*, establishes an amount of positive feedback between the power and control circuits of transistor 203*a***.

In order that oscillator 200A may generate firing pulses when a substantial positive voltage exists between control junction **202*a* and ground, the base-emitter control circuit of transistor 203*a* is connected between positive bus 11 and ground through a current limiting resistor 213*a* and conductor 207*a*. Zener or breakdown diode 214*a* and a diode 215*a* are connected across exciting winding 204*a* to control the time required to reset the flux in the core of transformer 205*a* after the occurrence of saturation therein in the course of cyclic-blocking oscillator operation. Thus, zener diode 214*a*** controls the lapse of time which separates firing pulses.

The operation of blocking oscillator 200A will now be described. Assuming transistor **203*a* is initially nonconducting, a current flows from positive bus 11 through resistor 213*a*, the base-emitter junction of transistor 203*a* and conductor 207*a* to ground. This base-emitter current initiates the flow of a current from positive bus 11 through resistor 206*a*, exciting winding 204*a* and the collector-emitter power circuit of transistor 203*a* to ground which current causes a positive voltage to be induced across winding 204*a*. As a result of the voltage induced across exciting winding 204*a*, an induced voltage appears across feedback winding 208*a* which aids the base-emitter current flowing in transistor 203*a* thorough resistor 213*a*. This additional control current flows from feedback winding 208*a* through conductor 209*a*, the base-emitter control circuit of transistor 203*a*, conductor 207*a*, diode 212*a*, and resistor 210*a* to further increase the collector-emitter conduction of transistor 203*a*. Thus, the conduction of transistor 203*a* increases regeneratively to establish a firing pulse of short rise time on output winding 201*a***.

After the above-described activity has continued for a predetermined time, the core of feedback transformer **205*a* saturates to terminate the feedback voltage across winding 208*a*. This termination decreases the conduction of transistor 203*a*. Under these conditions the polarity of the voltage across exciting winding 204*a* reverses as the inductance of the latter attempts to maintain the previous value of current therethrough. Because of the reversal in the polarity of the voltage across winding 204*a*, the feedback voltage induced across winding 208*a* reverses and opposes the current flowing in the base-emitter circuit of transistor 203*a* through resistor 213*a*. Thus, the conduction of transistor 203*a* decreases regeneratively after the core of transformer 205*a*** saturates.

After the energy stored in the magnetic filed of the exciting winding is exhausted, the oscillator circuit attains its initial condition, whereupon subsequent cycles of operation may begin.

In view of the foregoing, it will be seen that it is essential to the continued operation of firing pulse-generating means 200A that a positive voltage appears between control junction **202*a* and ground. This is because the latter voltage must have a magnitude sufficient to establish the flow of the above-described initial base-emitter current in transistor 203*a*. Thus, while control junction 202*a* is at ground potential, undesired pulses cannot appear across the output of firing pulse-generating means 200A**.

In accordance with an important object of the invention pulse suppression means 400 is arranged to connect control junctions **202*a* and 202*b* substantially to ground potential for the duration of those periods during which there exists the possibility of overlap between the outputs of firing pulse-generating means 200A and 200B. In this manner the undesired portion of the outputs of firing pulse-generating means 200A and 200B** are blanked out.

To the end that pulse-generating means 200A and 200B may be energized alternately and severally, the switching means 300 is provided. In the embodiment of FIG. 1 switching means 300 includes a control pulse-generating means 301 and a control pulse responsive switching means 302. Together these circuits comprise a free-running, multistate switching circuit which energizes first one and then the other of the firing pulse-generating circuits by causing ground potential to appear at first one and then the other of its output terminals **304*a* and 304*b* which are, in turn, connected to control junctions 202*a* and 202*b***, respectively.

Control pulse-generating means 301 produces a periodic succession of positive control pulses between an output terminal 303 and ground, these pulses causing the transition between the operation of one firing pulse-generating circuit 200A or 200B and operation of the other 200B or 200A. Thus, control pulse-generating means 301 sets the operative frequency for the control circuit of FIG. 1. Since these pulses may be provided from any of the numerous free-running pulse generators such as unijunction oscillators, blocking oscillators and the like which are well-known to those skilled in the art, this portion of the circuit is shown in block form only.

To the end that the pulses generated by control pulse-generating means 301 may be utilized to control the voltages appearing at control junctions **202*a* and 202*b*, the control pulse responsive switching means 302 is provided. The outputs 304*a* and 304*b* of switching means 302, are connected to control junctions 202*a* and 202*b*, respectively. When the outputs of switch means 302 are in a first operative state, terminal 304 attains a predetermined positive voltage with respect to ground and terminal 304*b* is substantially at ground potential; when the outputs of switch means 302 are in their second operative state, the latter voltage conditions reverse. A reversal in the states of the outputs of switch means 302 occurs after each pulse from control pulse-generating means 301**. Since this switching may be accomplished by any of the numerous switching circuits such as bistable multivibrators, clocked flip-flops and the like which are well-known to those skilled in the art, this portion of the circuit is shown in block form only.

The operation of free-running switching means 300 in conjunction with the firing pulse-generating circuits 200A and 200B can result in overlapping in the operation of firing pulse-generating means 200A and 200B and the resulting simultaneous firing of thyristors such as **101*a* and 101*b*. Such a condition is detrimental to overall satisfactory operation of the circuit in that DC source 105 can be short-circuited and other components of the power circuit may be burned out. To the end that this undesirable condition may be avoided there is provided, in accordance with the invention, a pulse suppression circuit 400. In a first mode of operation, as the circuitry of FIG. 1 is first energized, pulse suppression circuit 400 connects control junctions 202*a* and 202*b* to ground (notwithstanding the states of the outputs of free-running switching means 300) and maintains this deenergizing condition until after the free-running switching means 300 becomes fully operative. In a second mode of operation, pulse suppression circuit 400 connects control junctions 202*a* and 202*b* to ground for the duration of the control pulse from control pulse-generating means 301. This insures that the previously conducting firing pulse-generating means 200A and 200B will be deenergized before the other pulse-generating means is alternately energized. Thus, pulse suppression circuit 400 introduces an inoperative or blanked out period for both of the firing pulse-generating means during those periods, such as starting or change of state in switching means 302**, when detrimental simultaneity of thyristor firing pulses might otherwise occur.

Referring to pulse suppression circuit 400 there is shown a variable conducting means 401 which here takes the from of an NPN transistor. The collector-emitter power circuit of this transistor is connected between ground and control junctions **202*a* and 202*b* through diodes 402*a* and 402*b* respectively; each of these diodes serves to prevent the voltage appearing at the base of the transistors 203*a* or 203*b* from influencing the voltage appearing at the base of the other when pulse suppression circuit 400** is quiescent. Because the base-emitter circuit of transistor 401 is connected between ground and the output 303 of control pulse-generating means 301 by a conductor 404 and is also connected between ground and the positive bus 11 by transient conducting means, here shown as a capacitor 405, transistor 401 is subject to dual control. This dual control is desirable to achieve the above-described two modes of operation.

The operation of pulse suppression circuit 400 will now be described. Assuming that the circuit of the invention as shown in FIG. 1 is quiescent before the application of operative power, the capacitor 405 will be in an uncharged condition. Consequently, upon the application of DC power, capacitor 405 will for a time support the flow of a current from positive bus 11, through capacitor 405, a capacitor isolating diode 406, the resistor 403, and the base-emitter junction of transistor 401 to ground. The base-emitter current causes transistor 401 to conduct collector-emitter and thereby bring the potential of control junctions 202*a* and 202*b* at least below the potential required to sustain operation in firing pulse-generating circuits 200A and 200B through isolating diodes 402*a* and 402*b*. Under these conditions firing pulse-generating means 200A and 200B are inoperative and remain so until the charging of capacitor 405 through resistors 403 and 403*a* cuts off the flow of base-emitter control current for transistor 401. When capacitor 405 is fully charged, transistor 401 ceases to conduct. This terminates the operation of pulse suppression circuit 400 in the first mode and causes the latter circuit to relinquish control over the firing pulse generating means 200A and 200B. The time at which capacitor 405 becomes fully charged is preset to follow the attainment of full operation in switching means 300.

Since transistor 401 is subject to dual control, that is, from positive bus 11 as well as from terminal 303, the pulse suppression circuit 400 retains a degree of control over the operation of firing pulse-generating means 200A and 200B after capacitor 405 becomes fully charged. While pulse suppression circuit 400 operates in its second mode, positive voltage pulses which appear between output terminal 303 of control pulse-generating means 301 and ground produce base-emitter turn-on current in transistor 401. As a result, transistor 401 conducts to render junctions 202*a* and 202*b* at ground potential disabling control junctions 202*a* and 202*b* while control pulses from the control pulse-generating means 301 persist. Since this control pulse causes the suppression of the outputs of both firing pulse generating circuits 202*a* and 202*b* immediately preceeding the reversal of states of the outputs 304*a* and 304*b* of switching means 302, it is apparent that pulse suppression circuit 400 introduces an off period for both 200A and 200B which ensures that the subsequently energized firing pulse-generating circuit 200A or 200B comes on when the other firing pulse-generating circuit is inoperative thus preventing simultaneity in the operation thereof.

In view of the foregoing it will be seen that during the initial application of power, charging current through capacitor 405 renders transistor 401 conducting. This conduction, in turn, applies ground potential to control junctions 202*a* and 202*b* to turn off transistors 203*a* and 203*b* thus assuring no application of firing pulses to thyristors 101*a* and 101*b*. It will further be seen that during the time when control pulses are present between terminal 303 and ground, transistor 401 is rendered conducting to ground control junctions 202*a* and 202*b* and again prevents the application of firing pulses to thyristors 101*a* and 101*b*. As a result, firing pulses from firing pulse-generating circuits 200A and 200B are suppressed during both of the above conditions. Thus, simultaneity in the operation of firing pulse-generating circuits 200A and 200B is prevented during those periods when there exists a possibility of simultaneous operation. Consequently, destruction of circuit components and the power source from such simultaneous firing is eliminated.

Figure 2:
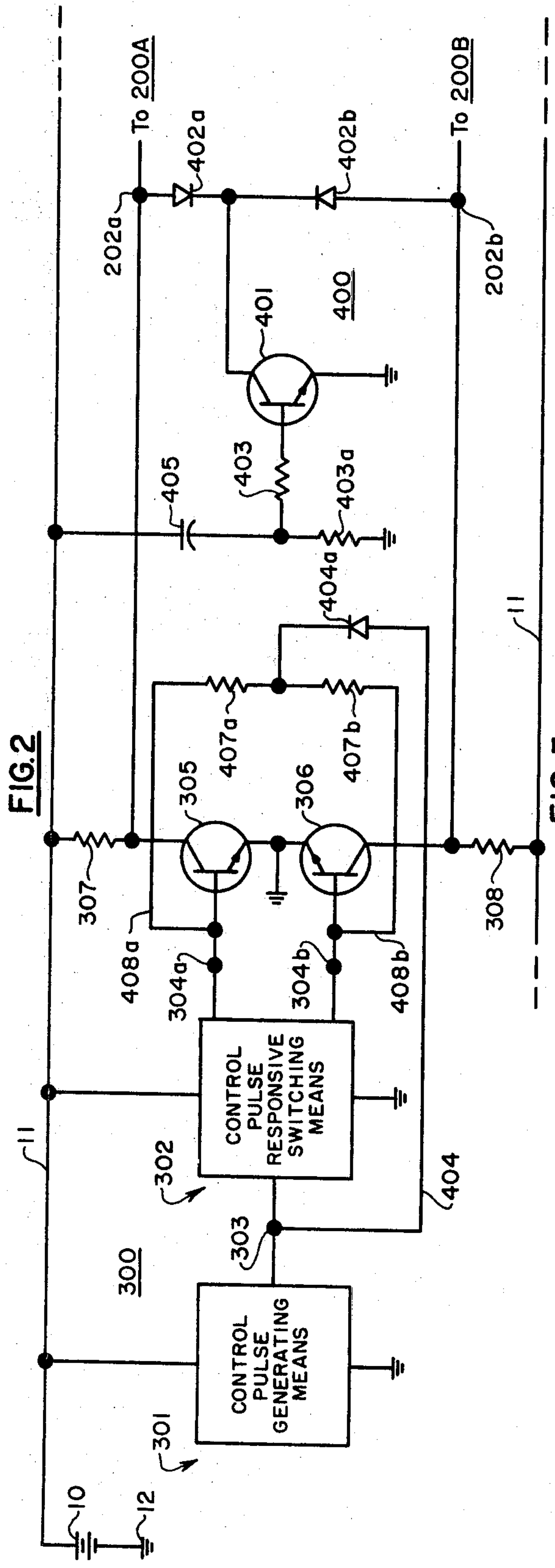
FIG. 2 is a schematic diagram of a modified form of circuit embodying the invention; and, FIG. 3 is a schematic diagram of a still further modified form of circuit embodying the invention.

Referring to FIG. 2, there is shown an embodiment of the invention similar to that of FIG. 1 and like functioning parts are, therefore, similarly numbered. It will be understood that the power circuit 100 of FIG. 1 and the firing pulse-generating circuitry of that FIG. are adapted to be connected to the control junctions of FIG. 2.

In the first or starting mode pulse suppression circuit 400 of FIG. 2 operates in the manner described with reference to the activity of capacitor 405 and transistor 401 in FIG. 1. In the second mode pulse suppression circuit 400 operates by controlling the final or output stages of pulse responsive switching means 302. In the circuit of FIG. 2 these final or output stages include transistors 305 and 306 which are supplied with operative power by bus 11 through resistors 307 and 308.

During that portion of the operating cycle of switching means 300 when control pulses do not appear between terminal 303 and ground, the voltages present between control junctions 202*a* and 202*b* and ground are controlled in accordance with the voltages present between ground and output terminals 304*a* and 304*b*, respectively. In the present instance this is accomplished by connecting the respective base-emitter circuits of transistors 305 and 306 between terminals 304*a* and 304*b* and ground, and by connecting the respective collector-emitter circuits thereof between terminals 202*a* and 202*b* and ground. As a result, when the voltage of one of the outputs 304*a* or 304*b* is positive from ground, the transistor whose base is connected to that output conducts through its collector-emitter circuit to apply ground potential to the respective control junction. While this condition persists no output pulses are produced by the respective firing pulse-generating circuit. At this time firing pulses are being produced by the remaining firing pulse generator.

To the end that the appearance of a control pulse between terminal 303 and ground suppresses the outputs of all firing pulse-generating means, junction 303 is connected to the bases of transistors 305 and 306 through conductor 404, an isolating diode 404*a*, current proportioning resistors 407*a* and 407*b* and conductors 408*a* and 408*b*. The latter circuit connectors provide paths for the flow of currents from control pulse-generating means 301 to ground which currents establish conduction in transistors 305 and 306 during each control pulse. This conduction, as described previously, applies ground potential to control junctions 202*a* and 202*b* to suppress the outputs of both firing pulse-generating means 200A and 200B in preparation for the next reversal of state between terminals 304*a* and 304*b*.

While the control circuit of the invention as exemplified by FIGS. 1 and 2 has been described with reference to a power circuit having only two gate controlled-switching devices such as those shown at 101*a* and 101*b*, it will be understood that the control circuit of the invention can be utilized with power circuits having any number of such gate controlled-switching devices.

Figure 3:
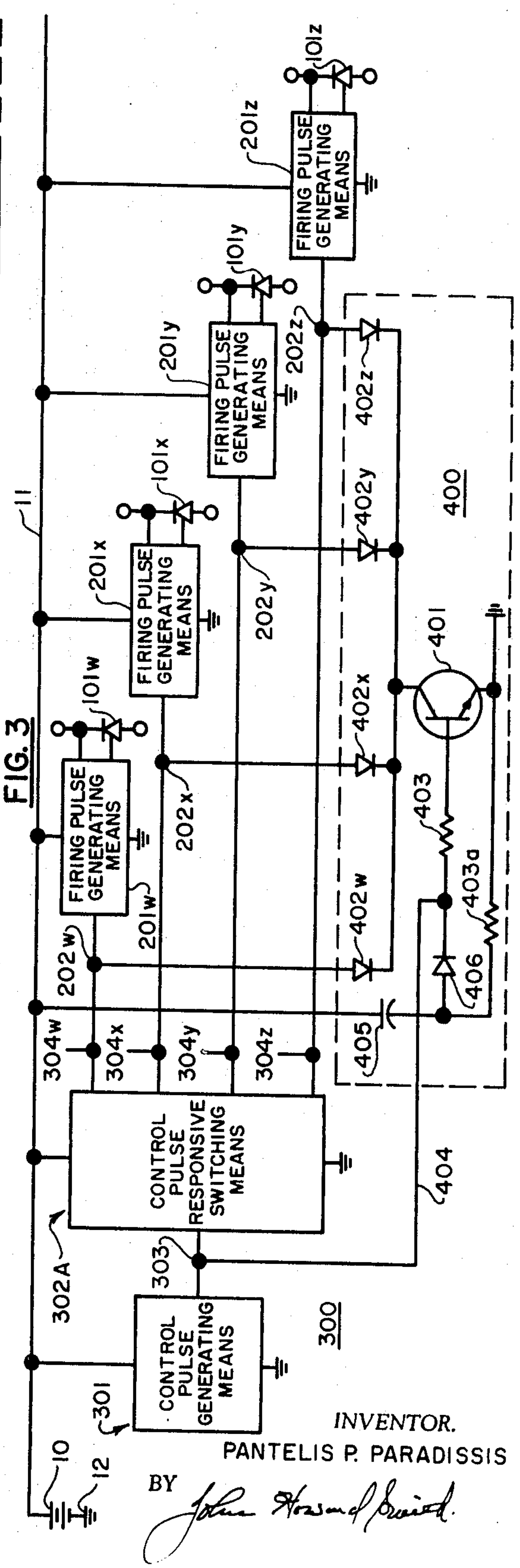

Accordingly, FIG. 3 shows a control circuit arranged to eliminate undesired simultaneity in the conduction of any two or more of the four thyristors shown therein. The embodiment of the invention shown in FIG. 3 is similar in many respects to the embodiments of FIGS. 1 and 2, and like functioning parts are similarly numbered.

The control circuit of FIG. 3 includes control pulse responsive switching means 302*a* which changes the pattern of voltages appearing at outputs 304*w*, 304*x*, 304*y* and 304*z* each time a control pulse appears between terminal 303 and ground. The outputs 304*w*, 304*x*, 304*y* and 304*z* are connected to the control junctions 202*w*, 202*x*, 202*y* and 202*z* respectively. When these control junctions are grounded, the generation of firing pulses from firing pulse-generating circuits 201*w*, 201*x*, 201*y* and 201*z*, respectively, is suppressed. Thus, while junctions 201*w*, 201*x*, 201*y* and 201*z* are grounded, gate pulses are prevented from being applied to thyristors 101*w*, 101*x*, 101*y* and 101*z*, respectively.

As described previously, when transistor 401 is caused to conduct, either as a result of charging current through capacitor 405 during starting or as a result of control pulses appearing between terminal 303 and ground, control junctions 202*w*, 202*x*, 202*y* and 202*z* are grounded. In this manner, the possibility of undesired simultaneous application of firing signals to two or more thyristors is eliminated.

From the foregoing description, it is apparent that there has been disclosed herein a control network for use with circuits having a plurality of gate controlled-switching elements which, in a first mode of operation, as power is first applied to the circuitry, deenergizes all firing pulse-generating means until the free-running switching means becomes operative to assume control thereover. Similarly, in a second mode of operation, during the normal switching sequence, the circuit of the invention responds to pulses from the control pulse-generating means to ensure the absence of firing pulses from all of the gate controlled-switching elements and thus prevents the simultaneous actuation of any two or more firing pulse-generating means.

It will be understood that the embodiment shown herein are for illustrative purposes only and may be modified without departing from the spirit from the spirit and scope of the appended claims.

I claim:

1. In a control circuit for providing firing pulses to each of a plurality of gate controlled-switching elements, in combination, a source of operative voltage, switching means having a plurality of outputs and including control pulse-generating means, means for connecting said switching means across said source of operative voltage, a plurality of firing pulse-generating means, each of said firing pulse-generating means having a control junction, the operative condition of said firing pulse-generating means being controlled in accordance with the voltage of said control junctions, means for connecting said firing pulse-generating means across said source, means for connecting said firing pulse-generating means to the gates of respective gate controlled-switching elements, means for connecting the control junctions of said firing pulse-generating means to respective outputs of said switching means, pulse suppression means, means for connecting said pulse suppression means in control relationship to the control junctions of said firing pulse-generating means, means for connecting said pulse suppression means in pulse responsive relationship severally to one of said pulse-generating means, means for connecting said pulse suppression means to said source, transient conducting means, means for connecting said transient conducting means across said source and in energizing relationship to said pulse suppression means, the energization of said pulse suppression means serving to control the generation of firing pulses in said firing pulse-generating means under all operating conditions of said switching means.

2. In a control circuit for providing a firing signal to each of a plurality of gate controlled-switching elements, in combination, a source of operating voltage, control pulse-generating means, control pulse responsive switching means having a plurality of outputs, means for connecting said control pulse-generating means and said switching means across said source of operating voltage, means for connecting said control pulse-generating means to said control pulse responsive switching means, a plurality of firing signal-generating means, each of said firing signal-generating means including a control junction, the operative condition of each of said firing pulse-generating means being controlled in accordance with the voltage of the respective control junction, means for connecting said firing signal-generating means across said source, means for connecting said firing signal generating means to the gates of respective gate controlled-switching elements, means for connecting the control junctions of said firing signal-generating means to respective outputs of said switching means, pulse suppression means, means for connecting said pulse suppression means in control relationship to the control junctions of each of said firing signal-generating means, means for connecting said pulse suppression means in pulse responsive relationship to said control pulse-generating means, means for connecting said pulse suppression means to said source, transient conducting means, means for connecting said transient conducting means across said source and in energizing relationship to said pulse suppression means, the energization of said pulse suppression means serving to control the generation of the firing signal by said firing signal-generating means under all operating conditions of switching means.

3. In a control circuit for providing firing pulses to each of a plurality of gate controlled-switching elements, the combination of a source of operative voltage, a plurality of firing pulse-generating means each having an output winding and a control junction, means for connecting said firing pulse-generating means across said source, means for connecting the output windings of said firing pulse-generating means to predetermined gate controlled-switching elements, the generation of firing pulses in each firing pulse-generating means being controlled in accordance with the voltage appearing at the respective control junction, switching means having a plurality of outputs and including control pulse-generating means, said switching means being arranged to produce a sequence of output voltage pulses generated by said control pulse-generating means, means for connecting said switching means across said source, means for connecting respective outputs of said switching means across said source, means for connecting respective outputs of said switching means in control relationship to the control junction of respective firing pulse-generating means, pulse suppression means, means for connecting said pulse suppression means in control voltage establishing relationship to each of said control junctions, means for connecting said pulse suppression means in pulse responsive relationship to one of said pulse-generating means and means for connecting said pulse suppression means to said source of operative voltage.

4. In a control circuit for providing firing pulses to each of pulses to each of a plurality of gate controlled-switching elements, in combination, a DC source, control pulse-generating means having output means, means for connecting said control pulse-generating means for connecting said control pulse-generating means across said DC source, control pulse responsive switching means having input means and a plurality of outputs, means for connecting said control pulse responsive switching means across said DC source, means for connecting the output means of said control pulse-generating means in switching control relationship to the input means of said control pulse responsive switching means, a plurality of firing pulse-generating means, for connecting said firing pulse-generating means across said DC source, each of said firing pulse-generating means having a control junction, the generation of firing pulses by each firing pulse-generating means being controlled in accordance with the voltage between the respective control junction and one terminal of said DC source, means for connecting the outputs of said control pulse responsive switching means to the control junctions of said firing pulse-generating means, variable conducting means having power circuit means and control circuit means, means for connecting the control circuit means of said variable conducting means between the output means of said control pulse-generating means and one terminal of said DC source, means for connecting the power circuit means of said variable conducting means between said control junction means and one terminal of said DC source.

5. In a control circuit for providing firing pulses to a plurality of gate controlled-switching elements, in combination, a DC source, control pulse-generating means having output means, means for connecting said control pulse-generating means across said DC source, control pulse responsive switching means having input means and a plurality of outputs, means for connecting said switching means across said DC source, means for connecting the output means of said control pulse-generating means to the input means of said control pulse responsive switching means, a plurality of firing pulse-generating means each having a control junction, means for connecting said firing pulse-generating means across said DC source, the generation of firing pulses by each firing pulse-generating means being controlled in accordance with the potential between the respective control junction and one terminal of said DC source, a plurality of variable conducting means each having a power circuit and a control circuit, means for connecting the control circuits of said variable conducting means between one terminal of said DC source and respective outputs of said control pulse responsive switching means, means for connecting the power circuits of said variable conducting means for connecting the power circuits of said variable conducting means between said one terminal of said DC source and respective control junctions of said firing pulse-generating means, means for connecting the control circuits of said variable conducting means between said one terminal of said DC source and the output means of said control pulse-generating means.

6. In a control circuit for providing firing pulses to a plurality of gate controlled switching elements, in combination, a DC source, a plurality of firing pulse generating means for energizing the gates of respective gate controlled-switching elements, means for connecting said firing pulse generating means across said DC source, each of said firing pulse-generating means including controllable conducting means having two power electrodes and a control electrode, said firing pulse-generating means being adapted to produce firing pulses during those periods when the potential between respective control electrodes and one terminal of said DC source exceeds a predetermined value, control pulse-generating means across the DC source, control pulse responsive switching means having input means and a plurality of outputs, means for connecting said switching means across said DC source, means for connecting the output means of said control pulse-generating means to the input means of said control pulse responsive switching means, means for connecting the outputs of said switching means in potential controlling relationship to the control electrodes of respective controllable conducting means, variable conducting means having a power circuit and a control circuit, means for connecting the control circuit of said variable conducting means between the output means of said control pulse-generating means and one terminal of said DC source, means for connecting the power circuit of said variable conducting means between said one terminal of said DC source and the control electrodes of said controllable conducting means, whereby the conduction of said variable conducting means reduces the potential of the control electrodes of said controllable conducting means below the level of potential required to sustain firing pulse generating activity.